(12) United States Patent
Gong et al.

(10) Patent No.: US 12,359,988 B2
(45) Date of Patent: Jul. 15, 2025

(54) SENSING SUBSTRATE, MANUFACTURING METHOD THEREFOR AND ELECTRONIC APPARATUS

(71) Applicants: Beijing BOE Sensor Technology Co., Ltd., Beijing (CN); BOE Technology Group Co., Ltd., Beijing (CN)

(72) Inventors: Lin Gong, Beijing (CN); Yue Li, Beijing (CN); Wenbo Chang, Beijing (CN); Yuelei Xiao, Beijing (CN); Xue Cao, Beijing (CN); Xuechao Song, Beijing (CN); Yi Zhou, Beijing (CN); Kidong Han, Beijing (CN); Baijun Zhou, Beijing (CN); Feng Qu, Beijing (CN); Yifan Wu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,590

(22) PCT Filed: May 31, 2021

(86) PCT No.: PCT/CN2021/097344
§ 371 (c)(1),
(2) Date: Dec. 8, 2022

(87) PCT Pub. No.: WO2022/252037
PCT Pub. Date: Dec. 8, 2022

(65) Prior Publication Data
US 2024/0044730 A1   Feb. 8, 2024

(51) Int. Cl.
*G01L 1/22* (2006.01)
*G01K 1/024* (2021.01)
*G01K 1/14* (2021.01)

(52) U.S. Cl.
CPC .............. *G01L 1/225* (2013.01); *G01K 1/024* (2013.01); *G01K 1/14* (2013.01); *G01L 1/2206* (2013.01); *G01L 1/2287* (2013.01)

(58) Field of Classification Search
CPC ..... G01L 1/225; G01L 1/2206; G01L 1/2287; G01K 1/024; G01K 1/14; G01K 13/00; G01B 7/16; H05B 3/20
(Continued)

(56) References Cited

U.S. PATENT DOCUMENTS

2015/0069045 A1   3/2015   Coursey et al.
2016/0250015 A1   9/2016   Kim et al.
(Continued)

FOREIGN PATENT DOCUMENTS

CN   106767374 A   5/2017
CN   111134401 A   5/2020
(Continued)

*Primary Examiner* — Robert R Raevis
(74) *Attorney, Agent, or Firm* — Ling Wu; Stephen Yang; Ling and Yang Intellectual Property

(57) ABSTRACT

A sensing substrate and a manufacturing method thereof are provided. The sensing substrate includes a base substrate, a heat electrode and a strain detection electrode which are disposed on the base substrate, and an insulation layer covering the heat electrode and the strain detection electrode. The heat electrode is configured for heating, and the strain detection electrode is configured to detect strain. The heat electrode and the strain detection electrode each have a metal mesh structure.

20 Claims, 11 Drawing Sheets

(58) Field of Classification Search
USPC ............... 73/1.75, 763, 766, 767, 774, 855,
73/862.041–862.046, 862.08, 862.321,
73/862.325, 862.338, 862.392, 862.541,
73/862.636, 862.637, 865.3; 600/386,
600/388, 830, 393; 482/1, 5–8, 900
See application file for complete search history.

(56) References Cited

U.S. PATENT DOCUMENTS

2018/0235293 A1  8/2018  Lee et al.
2021/0033476 A1  2/2021  Toda et al.

FOREIGN PATENT DOCUMENTS

| CN | 111656129 A |   | 9/2020 |
|----|-------------|---|--------|
| CN | 112323498 A | * | 2/2021 |
| WO | 2015141988 A1 |  | 9/2015 |

* cited by examiner

SENSING SUBSTRATE, MANUFACTURING METHOD THEREFOR AND ELECTRONIC APPARATUS

CROSS-REFERENCE TO RELATED APPLICATION

The present disclosure is a U.S. National Phase Entry of International Application PCT/CN2021/097344 having an international filing date of May 31, 2021, and the contents disclosed in the above-mentioned application are hereby incorporated as a part of this application.

TECHNICAL FIELD

Embodiments of the present disclosure relate to, but are not limited to, the field of sensor technology, and in particular to a sensing substrate and a method for manufacturing the sensing substrate, and an electronic apparatus.

BACKGROUND

In recent years, smart wearable devices based on flexible electronics have become more and more popular. Wearable devices have been more and more used in military personnel' field combat or training, athletes' training, exercisers' physical fitness monitoring and health monitoring, etc. However, functions of current wearable devices are usually relatively simple, which affects user's experience with wearable devices.

SUMMARY

The following is a summary of subject matters described herein in detail. The summary is not intended to limit the scope of protection of claims.

An embodiment of the present disclosure provides a sensing substrate, which includes a base substrate, a heat electrode and a strain detection electrode, which are disposed on the base substrate, and an insulation layer covering the heat electrode and the strain detection electrode. The heat electrode is configured to perform heating, and the strain detection electrode is configured to detect strain. Each of the heat electrode and the strain detection electrode is in a metal mesh structure.

In an exemplary embodiment, the base substrate includes a first base substrate and a second base substrate, wherein the heat electrode is disposed on the first base substrate and the strain detection electrode is disposed on the second base substrate.

The sensing substrate further includes an adhesive layer, wherein the first base substrate, the heat electrode, the adhesive layer, the second base substrate, the strain detection electrode and the insulation layer are sequentially stacked from bottom to top, or the second base substrate, the strain detection electrode, the adhesive layer, the first base substrate, the heat electrode and the insulation layer are sequentially stacked from bottom to top.

In an exemplary embodiment, as shown in FIG. 3, the heat electrode and the strain detection electrode are respectively disposed on two opposite surfaces of the base substrate.

the sensing substrate further includes a first insulation layer and a second insulation layer, wherein the first insulation layer, the heat electrode, the base substrate, the strain detection electrode and the second insulation layer are sequentially stacked from bottom to top, or the first insulation layer, the strain detection electrode, the base substrate, the heat electrode and the second insulation layer are sequentially stacked from bottom to top.

In an exemplary embodiment, the base substrate includes a first base substrate and a second base substrate, wherein the heat electrode is disposed on the first base substrate and the strain detection electrode is disposed on the second base substrate;

the first base substrate, the heat electrode, the insulation layer, the strain detection electrode and the second base substrate are sequentially stacked from bottom to top, or the second base substrate, the strain detection electrode, the insulation layer, the heat electrode and the first base substrate are sequentially stacked from bottom to top.

In an exemplary embodiment, an orthogonal projection of the heat electrode on the first base substrate is a first metal mesh, and an orthogonal projection of the strain detection electrode on the base substrate is a second metal mesh, the first metal mesh includes multiple first repetitive units, and the second metal mesh includes multiple second repetitive units, and shapes and sizes of the first repetitive units are the same as those of the second repetitive units.

In an exemplary embodiment, the orthogonal projection of the heat electrode on the base substrate coincides with the orthogonal projection of the strain detection electrode on the base substrate.

In an exemplary embodiment, the orthogonal projection of the heat electrode on the base substrate and the orthogonal projection of the strain detection electrode on the base substrate are staggered.

In an exemplary embodiment, an orthogonal projection of the heat electrode on the first base substrate is a first metal mesh, and an orthogonal projection of the strain detection electrode on the base substrate is a second metal mesh, the first metal mesh includes multiple first repetitive units, and the second metal mesh includes multiple second repetitive units, a line width of the first repetitive units is less than 30 µm, and a line width of the second repetitive units is less than 10 µm.

In an exemplary embodiment, a ratio of the line spacing to the line width of each of the first repetitive units and the second repetitive units is between 0.005 and 0.02.

In an exemplary embodiment, an included angle between traces of each of the first repetitive units and the second repetitive units is between 60° and 120°.

In an exemplary embodiment, wherein a thickness of the heat electrode in a direction perpendicular to a surface of the sensing substrate is less than 5 µm, and a thickness of the strain detection electrode in the direction perpendicular to the surface of the sensing substrate is less than 5 µm.

In an exemplary embodiment, the heat electrode and the strain detection electrode are in an integrated structure.

In an exemplary some, the base substrate may be a flexible substrate.

An embodiment of the present disclosure further provides an electronic apparatus, the electronic apparatus includes the aforementioned sensing substrate, and further includes an apparatus body, a control circuit board and an energy storage part, which are disposed in the apparatus body.

The sensing substrate is disposed in the apparatus body and electrically connected to the control circuit board and the energy storage part respectively.

The control circuit board is configured to control the heat electrode and the strain detection electrode, and the energy storage part is configured to supply power to the heat electrode and the strain detection electrode.

In an exemplary embodiment, the control circuit board includes a main control unit, an impedance analysis unit, an analog-to-digital conversion unit, a switch unit and a temperature sensor.

The impedance analysis unit is electrically connected to the strain detection electrode and the analog-to-digital conversion unit respectively, and is configured to detect an electrical parameter of the strain detection electrode and output the detected electrical parameter to the analog-to-digital conversion unit.

The analog-to-digital conversion unit is electrically connected to the impedance analysis unit and the main control unit respectively, and is configured to receive the electrical parameter output by the impedance analysis unit, perform analog-to-digital conversion on the received electrical parameter, and output it to the main control unit.

The temperature sensor is electrically connected to the heat electrode and the main control unit respectively, and is configured to detect a temperature of the heat electrode and output the temperature to the main control unit.

The main control unit is electrically connected to the switch unit, the analog-to-digital conversion unit and the temperature sensor respectively, and is configured to perform strain detection according to the received electrical parameter and control the heat electrode according to a received temperature parameter.

In an exemplary embodiment, the heat electrode and the strain detection electrode are integrated into a common electrode, and the control circuit board includes a main control unit, an impedance analysis unit, an analog-to-digital conversion unit, a switch unit and a temperature sensor.

The impedance analysis unit is electrically connected to the common electrode and the analog-to-digital conversion unit respectively, and is configured to detect an electrical parameter of the common electrode and output the detected electrical parameter to the analog-to-digital conversion unit.

The analog-to-digital conversion unit is electrically connected to the impedance analysis unit and the main control unit respectively, and is configured to receive the electrical parameter output by the impedance analysis unit, perform analog-to-digital conversion on the received electrical parameters, and output it to the main control unit.

The temperature sensor is electrically connected to the common electrode and the main control unit respectively, and is configured to detect a temperature of the common electrode and output the temperature to the main control unit.

The main control unit is electrically connected to the switch unit, the analog-to-digital conversion unit and the temperature sensor respectively, and is configured to perform strain detection according to the received electrical parameter and control the common electrode according to a received temperature parameter.

In an exemplary embodiment, the electronic apparatus includes a heating mode, a strain detection mode and a sharing mode.

In the strain detection mode, the energy storage part loads a first voltage for the common electrode.

In the heating mode, the energy storage part loads a second voltage for the common electrode, wherein the first voltage is less than the second voltage.

In the sharing mode, in a strain detection stage, the energy storage part loads the first voltage for the common electrode, and in a heating stage, the energy storage part loads the second voltage for the common electrode, and the heating stage includes multiple heating time slots, and the strain detection stage is set in a gap between the heating time slots.

In an exemplary embodiment, the electronic apparatus further includes a control button and a fixation part which are disposed on the apparatus body.

The control button is electrically connected to the control circuit board.

The fixation part is configured to fix the electronic apparatus.

An embodiment of the present disclosure further provides a method for manufacturing a sensing substrate, which includes:

manufacturing a heat electrode and a strain detection electrode on a base substrate, wherein each of the heat electrode and the strain detection electrode is in a metal mesh structure, the heat electrode is configured to perform heating, and the strain detection electrode is configured to detect strain; and forming an insulation layer covering the heat electrode and the strain detection electrode.

In an exemplary embodiment, in a case that a thickness of the metal mesh in a direction perpendicular to a surface of the sensing substrate is less than or equal to 2 μm, the metal mesh is manufactured by a thin film manufacturing process;

in a case that the thickness of the metal mesh in the direction perpendicular to the surface of the sensing substrate is greater than 2 μm, the metal mesh is manufactured by a thick film manufacturing process or a photosensitive silver salt process.

In an exemplary embodiment, in a case that a depth-to-width ratio of the metal mesh is less than 1:1 and a trace width of the metal mesh is less than or equal to 30 μm, or in a case that the depth-to-width ratio of the metal mesh is greater than or equal to 1:1 and the trace width of the metal mesh is less than 5 μm, the metal mesh is manufactured by an imprinting process or an imprint electroplating process;

in a case that the line width of the metal mesh is greater than or equal to 20 μm, the metal mesh is manufactured by a screen printing process.

In an exemplary embodiment, in a case that the line width of the metal mesh is greater than or equal to 15 μm and the depth-to-width ratio of the metal mesh is less than 1:1, the metal mesh is manufactured by a laser cutting process.

Other aspects may be understood upon reading and understanding of the accompanying drawings and detailed descriptions.

BRIEF DESCRIPTION OF DRAWINGS

Accompany drawings are used to provide further understanding of technical solutions of the present disclosure, and form a part of the specification, and are used to explain the technical solutions of the present disclosure together with embodiments of the present disclosure, and they do not form limitations on the technical solutions of the present disclosure.

DETAILED DESCRIPTION

Multiple embodiments are described in the present disclosure. However, the description is exemplary and unrestrictive. Moreover, it is apparent to those of ordinary skills in the art that there may be more embodiments and implementation solutions in the scope of the embodiments described in the present disclosure. Although many possible combinations of features are shown in the accompanying drawings and discussed in specific implementations, many other combinations of the disclosed features are possible. Unless expressly limited, any feature or element of any embodiment may be used in combination with, or may be used to replace, any other feature or element in any other embodiment.

The present disclosure includes and conceives combinations with the features and elements known to those of ordinary skills in the art. The embodiments, features, and elements that have been disclosed in the present disclosure may also be combined with any conventional feature or element to form unique inventive solutions defined by the claims. Any feature or element of any embodiment may also be combined with a feature or an element from another inventive solution to form another unique inventive solution defined by the claims. Therefore, it should be understood that any of the features shown and/or discussed in the present disclosure may be embodied alone or in any suitable combination. Therefore, the embodiments are not to be limited except for the limitation by the appended claims and their equivalent replacements. Furthermore, various modifications and variations may be made within the scope of protection of the appended claims.

Moreover, when describing representative embodiments, the specification may have presented a method and/or a process as a particular sequence of steps. However, the method or the process should not be limited to the steps with the specific order on the premise that the method or the process is independent of the specific order of the steps described herein. Those of ordinary skills in the art will understand that other orders of step may also be possible. Therefore, the specific order of the steps illustrated in the specification should not be interpreted as a limitation on claims. Moreover, the claims directed to the method and/or process should not be limited to performing their steps in the described order, and those skilled in the art will readily appreciate that these orders may be varied and still remain within the essence and scope of the embodiments of the present disclosure.

Figure 1:
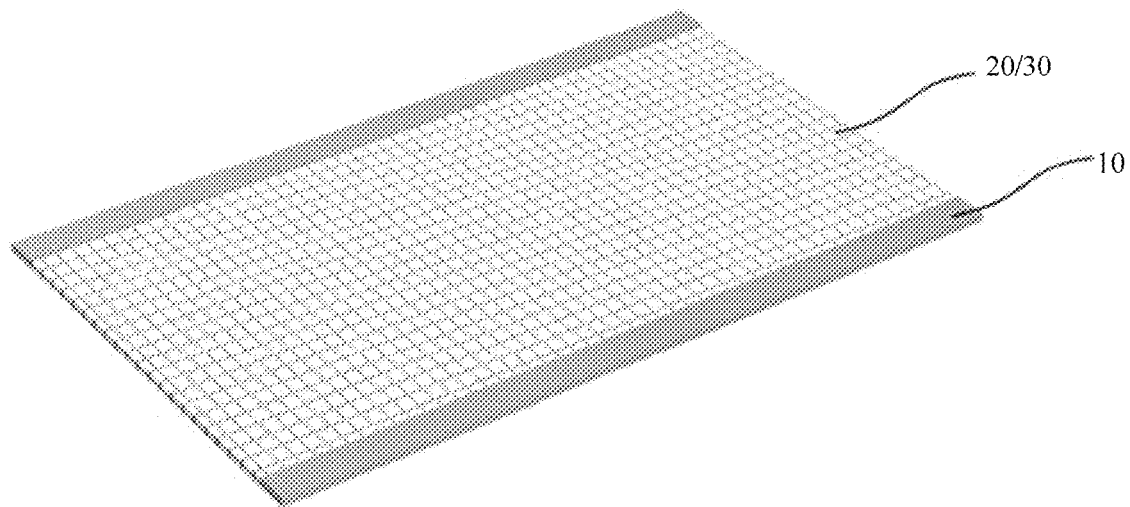
FIG. 1 is a schematic diagram of a structure of a sensing substrate according to an embodiment of the present disclosure.

As shown in FIG. 1, an embodiment of the present disclosure provides a sensing substrate, which includes a base substrate 10, a heat electrode 20 and a strain detection electrode 30 which are disposed on the base substrate 10, and an insulation layer (not shown in the figure) covering the heat electrode 20 and the strain detection electrode 30.

The heat electrode 20 is configured for heating, and the strain detection electrode 30 is configured to detect strain.

Both the heat electrode 20 and the strain detection electrode 30 are in a metal mesh structure.

According to actual situations of human body, joints are parts with many motions and large amplitudes of motions. Detection of shapes of the joints is conducive to reflecting a motion state of the human body. However, due to a lack of protection of muscles and fat, joints are sensitive to temperatures, and are prone to lesions after being exposed in coldness for long time. An embodiment of the present disclosure provides a sensing substrate, in which a heating function and a strain detection function are integrated by integrating a heat electrode 20 and a strain detection electrode 30 which are in a metal mesh structure on the base substrate 10, wherein the heat electrode 20 can play a role of heat preservation, and the integrated strain detection electrode 30 can monitor, by deformation, a motion state of a human body, therefore, the sensing substrate can be applied to wearable devices and has a wide range of application scenarios in the fields of sports and medical health. Furthermore, a manufacturing process of the sensing substrate is compatible with the current backplane's manufacturing process, which meets requirements of mass production.

Figure 2:
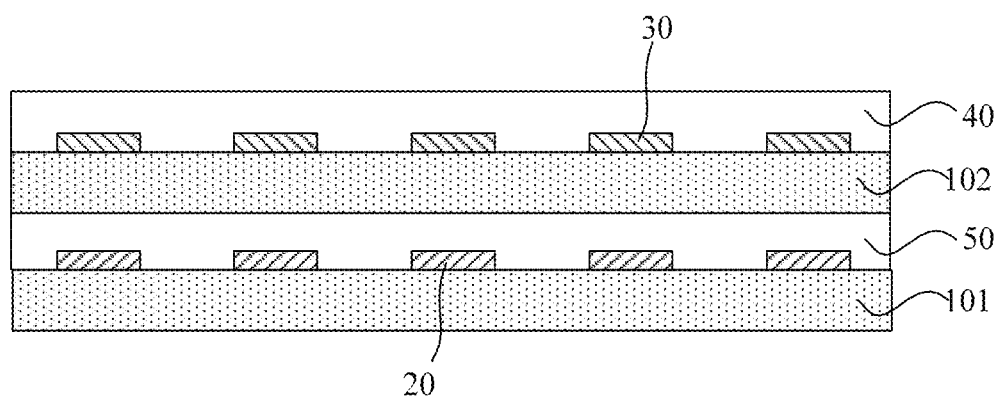
FIGS. 2 to 4 are schematic diagrams of cross-sectional structures of three types of sensing substrates according to an embodiment of the present disclosure.

In an exemplary embodiment, as shown in FIG. 2, the base substrate 10 includes a first base substrate 101 and a second base substrate 102, wherein the heat electrode 20 is disposed on the first base substrate 101 and the strain detection electrode 30 is disposed on the second base substrate 102.

The sensing substrate further includes an adhesive layer 50. The first base substrate 101, the heat electrode 20, the adhesive layer 50, the second base substrate 102, the strain detection electrode 30 and the insulation layer 40 are sequentially stacked from bottom to top.

During manufacturing of the sensing substrate in this embodiment, firstly, the heat electrode 20 is manufactured on a surface of the first base substrate 101, the strain detection electrode 30 is manufactured on a surface of the second base substrate 102, the first base substrate 101 and the second base substrate 102 are disposed to be aligned with each other, and the heat electrode 20 and the strain detection electrode 30, which are respectively disposed on two sides of the second base substrate 102, are bonded together by the adhesive layer 50 (made of an insulating material), and finally, the insulation layer 40 is manufactured on a surface of the sensing substrate. In another exemplary embodiment, the sensing substrate may also be provided by sequentially stacking the second base substrate 102, the strain detection electrode 30, the adhesive layer 50, the first base substrate 101, the heat electrode 20 and the insulation layer 40 from bottom to top.

Figure 3:
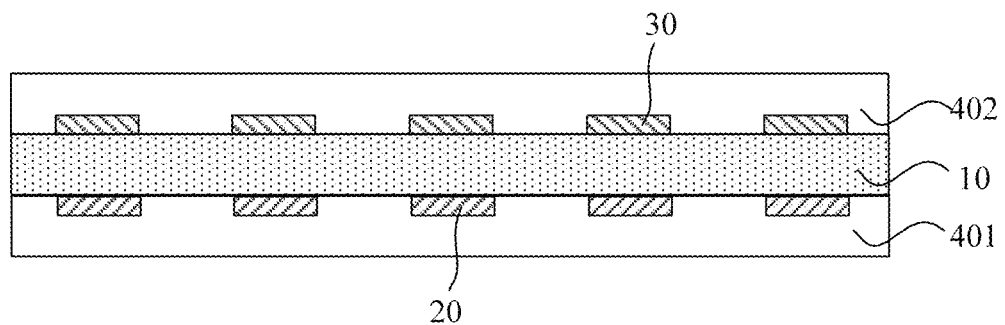

In an exemplary embodiment, as shown in FIG. 3, the heat electrode 20 and the strain detection electrode 30 are respectively disposed on two opposite surfaces of the base substrate 10.

The insulation layer of the sensing substrate includes a first insulation layer 401 and a second insulation layer 402, wherein the first insulation layer 401, the heat electrode 20, the base substrate 10, the strain detection electrode 30 and the second insulation layer 402 are sequentially stacked from bottom to top.

During manufacturing of the sensing substrate in this embodiment, firstly, the heat electrode 20 and the strain detection electrode 30 are respectively manufactured on upper and lower surfaces of the base substrate 10, and then an insulation layer is manufactured on each of the upper and lower surfaces of the base substrate respectively, to form the first insulation layer 401 and the second insulation layer 402. In another exemplary embodiment, the sensing substrate may also be provided by sequentially stacking the first insulation layer 401, the strain detection electrode 30, the base substrate 10, the heat electrode 20 and the second insulation layer 402, from bottom to top.

Figure 4:
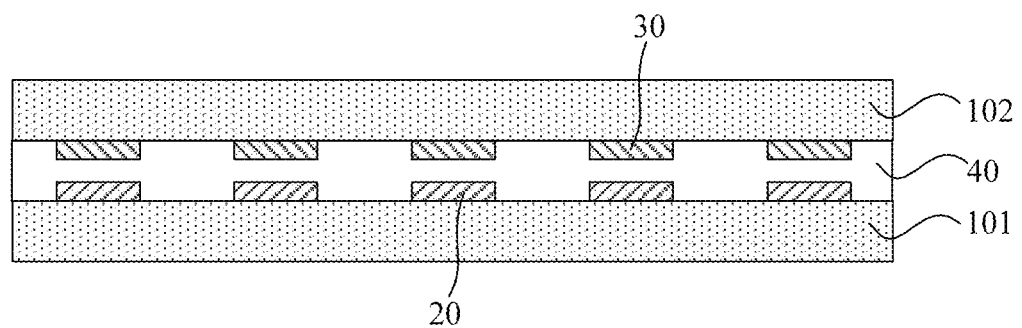

In an exemplary embodiment, as shown in FIG. 4, the base substrate 10 includes the first base substrate 101 and the second base substrate 102, wherein the heat electrode 20 is disposed on the first base substrate 101 and the strain detection electrode 30 is disposed on the second base substrate 102.

The first base substrate 101, the heat electrode 20, the insulation layer 40, the strain detection electrode 30 and the second base substrate 102 are sequentially stacked from bottom to top.

During manufacturing of the sensing substrate in this embodiment, firstly, the heat electrode 20 is manufactured on a surface of the first base substrate 101, the strain detection electrode 30 is manufactured on a surface of the second base substrate 102, the first base substrate 101 and the second base substrate 102 are disposed to be aligned with each other, and the heat electrode 20 and the strain detection electrode 30, which are disposed on a same side of the second base substrate 102, are bonded together by the adhesive layer 40 (made of an insulating material). In another exemplary embodiment, the sensing substrate may also be provided by sequentially stacking the second base substrate 102, the strain detection electrode 30, the insulation layer 40, the heat electrode 20 and the first base substrate 101 stacked from bottom to top.

In an exemplary embodiment, as shown in FIGS. 5a to 5d, an orthogonal projection of the heat electrode 20 on the base substrate 10 is a first metal mesh, and an orthogonal projection of the strain detection electrode 30 on the base substrate 10 is a second metal mesh. The first metal mesh includes multiple first repetitive units 201, and the second metal mesh includes multiple second repetitive units 301. Shapes and sizes of the first repetitive units 201 and the second repetitive units 301 are the same.

In an exemplary embodiment, the orthogonal projection of the heat electrode 20 on the base substrate 10 coincides with the orthogonal projection of the strain detection electrode 30 on the base substrate 10, or the orthogonal projection of the heat electrode 20 on the base substrate 10 and the orthogonal projection of the strain detection electrode 30 on the base substrate 10 are arranged in a staggered manner.

Figure 5A:
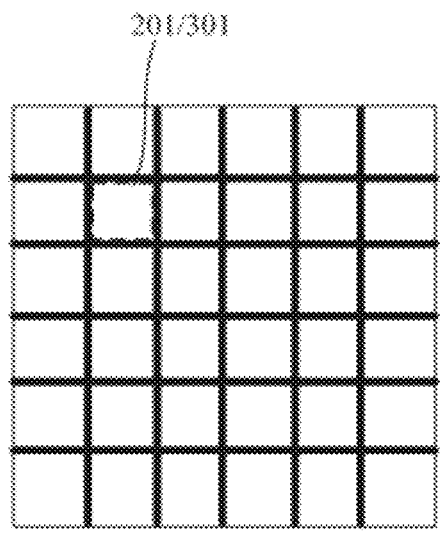
FIGS. 5a to 5d are schematic diagrams of projection structures of four types of heat electrodes and strain detection electrodes according to an embodiment of the present disclosure.
Figure 5B:
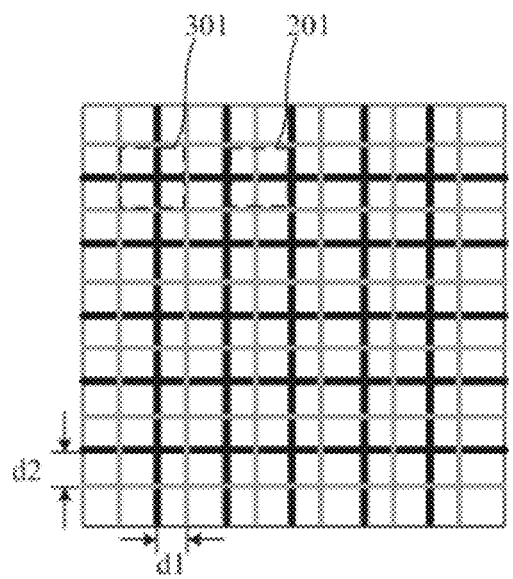
Figure 5C:
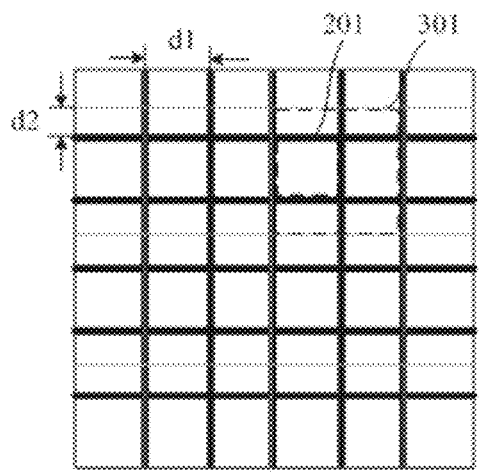
Figure 5D:
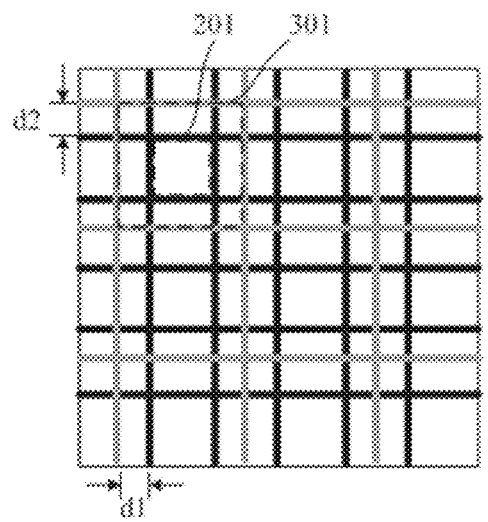

For example, taking an example in which each of the first metal mesh and the second metal mesh has an included angle of 90° between mesh traces, top views of the sensing substrate is shown in FIGS. 5a to 5d. In FIG. 5a, the orthogonal projection of the heat electrode 20 on the base substrate 10 completely coincides with the orthogonal projection of the strain detection electrode 30 on the base substrate 10. In view of an alignment accuracy in device manufacturing, generally, the orthogonal projection of the heat electrode 20 on the base substrate 10 and the orthogonal projection of the strain detection electrode 30 on the base substrate 10 are staggered from each other by a certain distance, as shown in FIG. 5b (for convenience of distinguishing, the heat electrode 20 and the strain detection electrode 30 are represented in different colors). In an embodiment of the present disclosure, in order to maximize light transmittance, it is necessary to ensure that the orthogonal projection of the heat electrode 20 on the base substrate 10 coincides with the orthogonal projection of the strain detection electrode 30 on the base substrate 10, or that the staggered distance from each other is less than a first distance.

In an exemplary embodiment, the orthogonal projection of the heat electrode 20 on the base substrate 10 includes multiple first traces and multiple second traces, and the orthogonal projection of the strain detection electrode 30 on the base substrate 10 includes multiple third traces and multiple fourth traces, wherein the multiple first traces and the multiple third traces all extend along a first direction, and the multiple second traces and the multiple fourth traces all extend along a second direction, and the first direction intersects with the second direction.

A distance d1 between a first trace and a third trace which are adjacent to each other is less than ½ of a distance between two adjacent first traces, and a distance d2 between a second trace and a fourth trace which are adjacent to each other is less than ½ of a distance between two adjacent second traces.

For example, the first direction may be a column direction, and the second direction may be a row direction.

In an exemplary embodiment, the orthogonal projection of the heat electrode 20 on the base substrate 10 is the first metal mesh, and the orthogonal projection of the strain detection electrode 30 on the base substrate 10 is the second metal mesh. The first metal mesh includes multiple first repetitive units 201, and the second metal mesh includes multiple second repetitive units 301. A line width of a first repetitive unit 201 (i.e., a trace width) is less than 30 µm, and a line width of a second repetitive unit 301 is less than 10 µm. In a case that the sensing substrate is not required to be transparent in an actual application scenario, an increase of the line width of the first metal mesh is conducive to improving a heating rate, and in view of manufacturing processes and device performance, a line width less than 30 µm is preferred. An increase of the line width of the second metal mesh increases power consumption and reduces sensitivity of strain detection. In view of the manufacturing processes and device performance, a line width less than 10 µm is preferred. When the transparency of the sensing substrate is required in an actual application scenario, the line widths of the first repetitive unit and the second repetitive unit are each less than 5 µm.

In an exemplary embodiment, a ratio of a line spacing to the line width of each of the first repetitive unit 201 and the second repetitive unit 301 is between 0.005 and 0.02, and when the transparency of the sensing substrate is required in an actual application scenario, the ratio of the line spacing to the line width of each of the first repetitive unit 201 and the second repetitive unit 301 is between 0.005 and 0.01. In a case that the repetitive units are in an irregular shape, an average value of center lines of adjacent traces may be taken as the line spacing.

In an exemplary embodiment, an included angle between traces of each of the first repetitive unit 201 and the second repetitive unit 301 is between 60° and 120°, which is conducive to manufacturing the traces in various processes.

In an exemplary embodiment, a thicknesses of each of the heat electrode 20 and the strain detection electrode 30 in a direction perpendicular to the surface of the sensing substrate are both less than 5 μm, such thickness is conducive to manufacturing of the electrodes, and an excessively high thickness may reduce reliability of the electrodes.

In an embodiment of the present disclosure, the line width w, the line spacing p and the included angle θ between traces of each of the heat electrode 20 and the strain detection electrode 30 may be designed differently according to actual situations.

Figure 6:
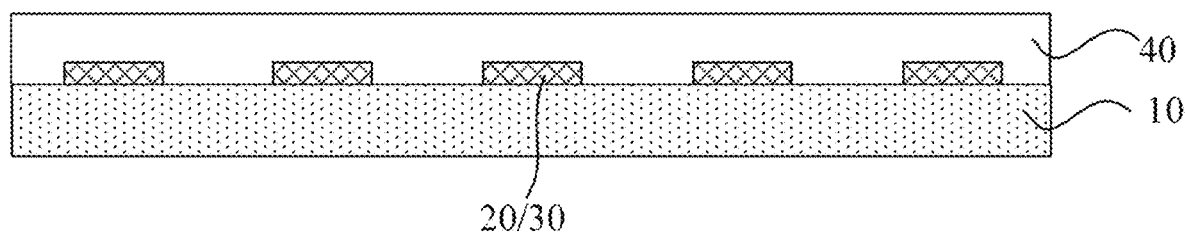
FIG. 6 is a schematic diagram of a cross-sectional structure of another sensing substrate according to an embodiment of the present disclosure.

In an exemplary embodiment, as shown in FIG. 6, the heat electrode 20 and the strain detection electrode 30 may be in an integrated structure.

During manufacturing of the sensing substrate in this embodiment, firstly, a common electrode with the functions of both the heat electrode 20 and the strain detection electrode 30 is manufactured on a surface of the base substrate 10, and then the insulation layer 40 is manufactured on the surface of the sensing substrate. In a cast that the heat electrode 20 and the strain detection electrode 30 are integrated into a common electrode, a top view of the sensing substrate may be seen in the aforementioned FIG. 5a. In this case, a shape of the common electrode may be designed according to actual scenarios.

In an exemplary embodiment, the base substrate may be a flexible substrate.

During use of the base substrate being a flexible substrate, the sensing substrate may be against the human body, and when the human body is in motion, the sensing substrate deforms correspondingly with the skin, so that a motion state of the human body can be detected.

In an exemplary embodiment, each of the heat electrode 20 and the strain detection electrode 30 is in a transparent metal mesh structure, so that the sensing substrate, which is fixed on a surface of any object, will not be easily observed from outside in a usage scenario where an aesthetic appearance is required.

Figure 7A:
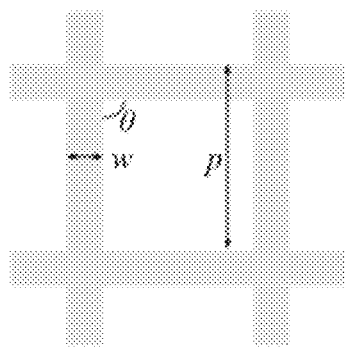
FIGS. 7a to 7b are schematic diagrams of structures of metal meshes according to an embodiment of the present disclosure.
Figure 7B:
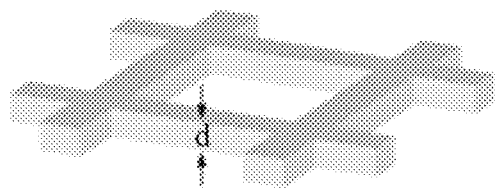

FIGS. 7a and 7b are schematic diagrams of a microstructure of a metal mesh structure of a heat electrode 20 and a strain detection electrode 30 according to an embodiment of the present disclosure, and here attention is mainly paid to their transmittance and resistance performance.

The transmittance T of the metal mesh may be calculated according to a proportion of metal in the mesh. When an included angle θ between traces of the metal mesh is 90°, as shown in FIG. 7a, when for the metal mesh, a line width=w, the line spacing=p and a proportion of metal is $$\frac{2pw - w^2}{p^2},$$

the transmittance of the metal mesh is $$T = 1 - \frac{2pw - w^2}{p^2} = \frac{(p-w)^2}{p^2}.$$

Similarly, a sheet resistance $R_s$ of the metal mesh can be calculated according to the proportion of metal in a case that a conductivity ρ of metal is known. As shown in FIG. 7b, if a thickness of the metal mesh is d, the sheet resistance of the metal mesh is $$R_s = \frac{\rho p}{dw} = \frac{\rho}{d}\left(\frac{1 - \sqrt{T} + T}{1 - \sqrt{T}}\right).$$

(1) Strain Detection Mechanism

A sensing substrate in an embodiment of the present disclosure may be used in a wearable device. During use, the wearable device may be against a human body, and when the human body is in motion, the wearable device deforms with the skin.

When the wearable device is not deformed, the resistance of the metal mesh is $$R = \frac{R_S L}{W}$$

where L is an overall length of the metal mesh and W is an overall width of the metal mesh.

When the wearable device deforms, the overall length and the overall width of the metal mesh deform along with the base substrate, then $$R'_s = \frac{\rho p'}{dw}, R' = \frac{R'_s \Delta L}{\Delta W},$$

where $R'_s$ is a sheet resistance after the deformation, R' is a resistance after the deformation, p' is a line spacing after the deformation, ΔL is an overall length after the deformation, and ΔW is an overall width after the deformation. Therefore, by applying a certain voltage to two sides of the strain detection electrode 30 and detecting a current flowing through the strain detection electrode 30, the resistance of the strain detection electrode 30 can be calculated, and then the deformation of the metal mesh of the strain detection electrode 30 can be detected.

(2) Heating Mechanism

A heating rate of the sensing substrate and a resultant temperature thereof depend on the thermal properties of the heat electrode and the base substrate.

Increased temperature of the heat electrode depends on generated power, $\Delta T = P/hA_{cond} = UI/hA_{cond}$, I=U/R, where p is power, U is an input voltage, I is a current, R is the resistance of the metal mesh of the heat electrode, h is a thermal conductivity coefficient of the material, and $A_{cond}$ is a total cross-sectional area of the heat electrode.

Heat generated by the heat electrode is $$\Delta Q = \frac{U^2 \Delta t}{R} = \Delta Q_{cond} + \Delta Q_{conv} + \Delta Q_{rad},$$

where Δt is heating time, $\Delta Q_{cond}$ is heat transferred by the heat electrode to the base substrate, $\Delta Q_{conv}$ is heat power loss of air convection, and $\Delta Q_{rad}$ is heat power loss of radiation.

$\Delta Q_{cond}$ is the heat transferred from the heat electrode to the base substrate, $$\Delta Q_{cond} = \frac{\lambda A_{cond} \Delta T_{cond} \Delta t}{\Delta x},$$

where $\lambda$ is the thermal conductivity coefficient of the base substrate, $A_{cond}$ is the total cross-sectional area of the heat electrode, and $\Delta T_{cond}/\Delta x$ is a temperature gradient.

$\Delta Q_{conv}$ is the heat power loss of air convection, $$\Delta Q_{conv} = \frac{h_{cond} A_{conV} \Delta T_{conv} \Delta t}{\Delta x},$$

where $h_{cond}$ is a convection heat transfer coefficient, $A_{cond}$ is the total cross-sectional area of the heat electrode, and $\Delta T_{conv}$ is a difference between temperature of a heat source and an ambient temperature.

$\Delta Q_{rad}$ is the power loss of radiation $\Delta Q_{rad} = \varepsilon \sigma A_{rad} \Delta T^4 \Delta t$, where $\varepsilon$ is an emissivity of the material, $\sigma$ is a Stefan Boltzmann constant, which is $5.67 \times 10-8$ W/m$^2 \cdot$K$^4$, and $A_{rad}$ is a radiation surface area. Because emissivity of a high-transparency material is low, when the heat electrode is in a transparent metal mesh structure, radiation loss of a transparent heater is very small and negligible.

To sum up, the power is $$P = \frac{U^2}{R} == \frac{\lambda A_{cond} \Delta T_{cond} \Delta t}{\Delta x} + h_{cond} A_{conV} \Delta T_{conv}.$$

According to the power P, an increased temperature of the heat electrode can be calculated.

Figure 8A:
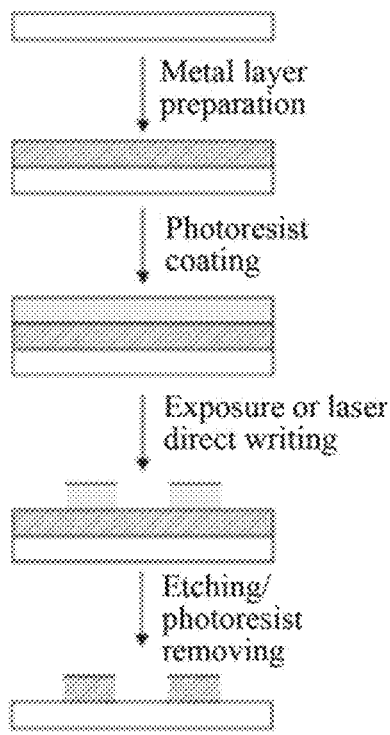
FIGS. 8a to 8g are schematic flowcharts of preparation processes of metal meshes according to an embodiment of the present disclosure.
Figure 8B:
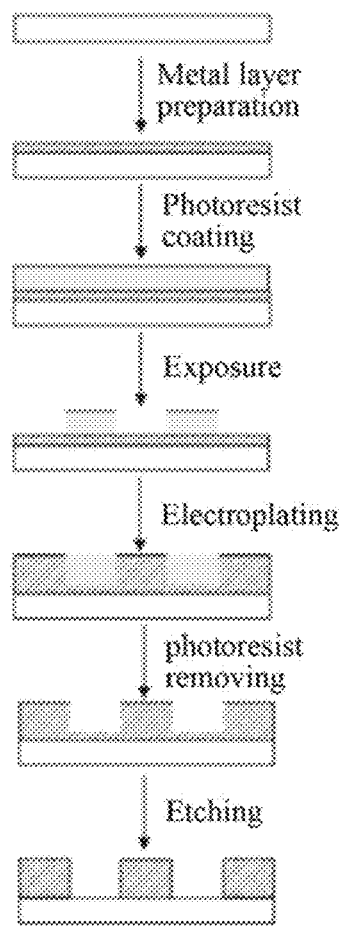
Figure 8C:
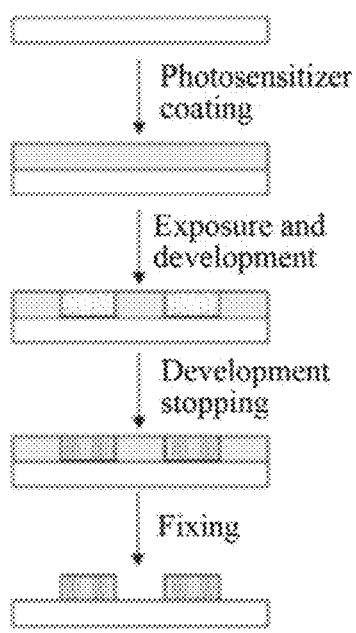
Figure 8D:
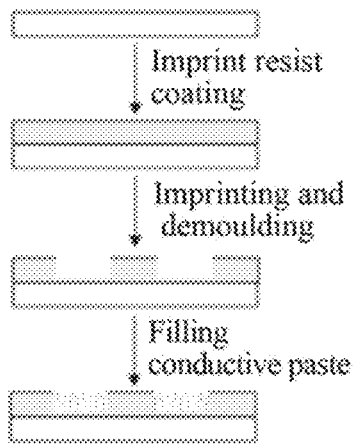
Figure 8E:
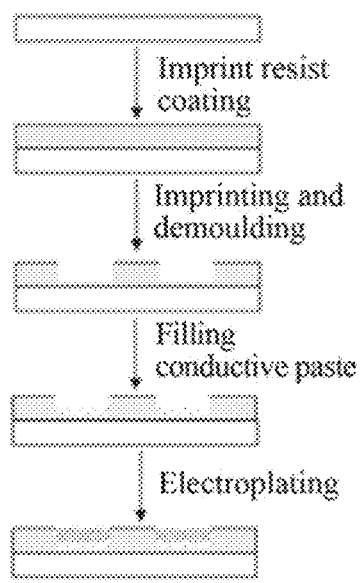
Figure 8F:
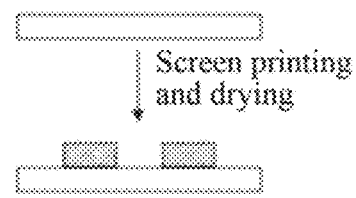
Figure 8G:
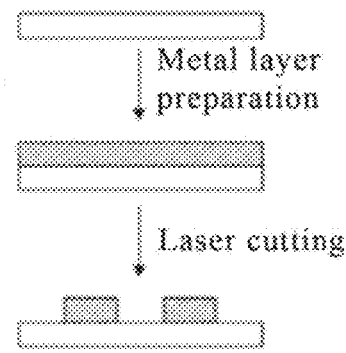

In an embodiment of the present disclosure, manufacturing processes of the metal mesh may be divided into a photoetching process (FIGS. 8a to 8c), a printing process (FIGS. 8d to 8f) and a laser process (FIG. 8g). Herein, a double-sided metal mesh structure can be manufactured on a same base substrate by the photoetching process and the printing process. Because an entire manufacturing procedure of the double-sided metal mesh structure is similar to that of a single-sided metal mesh structure, only the manufacturing processes of the single-sided metal mesh structure is introduced following.

In an embodiment of the present disclosure, the photoetching process of the sensing substrate includes a thin film manufacturing process (FIG. 8a), a thick film manufacturing process (FIG. 8b) and a photosensitive silver salt process (FIG. 8c).

Herein, in view of factors of manufacturing efficiency and costs, the thin film manufacturing process is generally suitable for manufacturing a sensing substrate with a metal mesh thickness h≤2 μm. As shown in FIG. 8a, manufacturing steps of the thin film manufacturing process are as follows:

① A metal layer is manufactured on a surface of a base substrate. The base substrate can be selected from a rigid substrate (such as glass, etc.) or a flexible substrate (such as thermoplastic polyester (PET), polyimide (PI), cycloolefin polymer (COP), polyethylene naphthalate (PEN), etc.), and the metal layer can be selected from aluminum (Al), molybdenum (Mo), copper (Cu), chromium (Cr), nickel (Ni), gold (Au), silver (Ag), etc. A manufacturing process can be selected from vapor phase methods (vacuum evaporation deposition method, sputtering method, ionizing vapor deposition method, epitaxial technology), liquid phase methods (spin coating, blade coating, screen printing, etc., generally suitable for metal paste) and chemical vapor deposition (thermal decomposition process, reduction reaction method), etc.

② A photoresist is coated.

③ The photoresist is patterned. In this step, the photoresist can be patterned by ultraviolet exposure or laser direct writing technology.

④ The metal layer is etched and the photoresist is stripped off. In this step, the etching process can be selected from a dry etching process and a wet etching process.

In view of the factors of manufacturing efficiency and costs, the thick film manufacturing process is generally suitable for manufacturing a sensing substrate with a metal mesh thickness h≥2 μm. As shown in FIG. 8b, manufacturing steps of the thick film manufacturing process are as follows:

① A metal layer is manufactured on a surface of a base substrate. It is recommended that the film thickness be as small as possible, and less than 500 nm as a preferred scheme. The base substrate can be selected from a rigid substrate (glass, etc.) or a flexible substrate (PET, PI, COP, PEN, etc.), and the metal layer can be selected from Al, Mo, Cu, Cr, Ni, Au, Ag, etc. The manufacturing process can be selected from vapor phase methods (vacuum evaporation deposition method, sputtering method, ionizing vapor deposition method, epitaxial technology), liquid phase methods (spin coating, blade coating, screen printing, etc., generally suitable for metal paste) and chemical vapor deposition (thermal decomposition process, reduction reaction method), etc.

② A photoresist is coated.

③ The photoresist is patterned. In this step, the photoresist can be patterned by ultraviolet exposure or laser direct writing technology.

④ The metal layer is electroplated. In this step, a material of a plating film layer can be selected from Cu, Ni, etc.

⑤ The photoresist is stripped off. In this step, the metal layer is groove-shaped.

⑥ The metal layer is etched. In this step, metal at the bottom of each groove is etched to make metal traces independent from each other.

In view of the factors of manufacturing efficiency and cost, the photosensitive silver salt process is generally suitable for manufacturing a sensing substrate with a metal mesh thickness h>2 μm. As shown in FIG. 8c, manufacturing steps of the photosensitive silver salt process are as follows:

① A photosensitizer is coated on a surface of a base substrate. The base substrate can be selected from a rigid substrate (glass, etc.) or a flexible substrate (PET, PI, COP, PEN, etc.) In this step, the photosensitizer consists of silver halide crystals, gelatin, additives and other materials, and a film thickness is recommended to be less than 6 microns.

② Exposure and development. In this step, the ultraviolet exposure technology is used to reduce silver ions in the silver halide of the photosensitizer to elemental silver.

③ Stop of development. In this step, an acid stop bath is added to an alkaline developer, and a neutralization reaction occurs, so that the developing process is stopped abruptly, and residual fixing solution and soluble renaturated silver salt are washed by water leaching and rinsing.

④ Fixing. In this step, sodium tetrathionate (Na$_2$S$_2$O$_3$) is commonly used for removing unreacted silver halide during development, so as to fix the influence of development gains.

In an embodiment of the present disclosure, a printing process of the sensing substrate includes an imprinting process (FIG. 8d), an imprint ectroplating process (FIG. 8e) and a screen printing process (FIG. 8f).

Among them, a metal mesh with a depth-to-width ratio <1:1 or ≥1:1 can be manufactured by the imprinting process. In a case that the depth-to-width ratio of metal mesh is <1:1, a trace width of the metal mesh manufactured by this process is ≤30 um. In a case that the depth-to-width ratio of the metal mesh is ≥1:1, the trace width of the metal mesh manufactured by this process is <5 um. This scheme has batch manufacturing processes such as roll-to-roll and roll-to-sheet etc. As shown in FIG. 8d, manufacturing steps of the imprinting process are as follows:

① An imprint resist is coated on a surface of a base substrate. In this step, the base substrate can be selected from a rigid substrate (glass, etc.) or a flexible substrate (PET, PI, COP, PEN, etc.) The imprint resist is usually a polymer that can be cured by heat or ultraviolet light. In this step, a thickness of the imprint film should be greater than a height of traces of the metal mesh.

② Imprinting and demoulding. In this step, an imprint mold is used for manufacturing a groove of the imprint resist, and then the mold is demoulded after curing. The imprint mold can be selected from metal mold, polymer mold, etc., and a curing method of the imprint resist can be selected from thermal curing, ultraviolet curing or combination of heat curing and ultraviolet curing.

③ A conductive paste is filled. In this step, the conductive paste is made to flow into the groove by a blade coating process, and after residual paste on the surface is scraped, solvent and other substances in the paste are volatilized by thermal curing or light curing, so that the metal particles are fusioned and converted into a partially continuous phase.

In the imprint electroplating process, an electroplating process is added on the basis of the imprinting process, and fluid metal is added to the partially continuous metal paste, which are conducive to reducing a sheet resistance of the metal mesh. A metal mesh with a depth-to-width ratio <1:1 or ≥1:1 can be manufactured by the imprint electroplating process. In a case that the depth-to-width ratio of metal mesh is <1:1, a trace width of the metal mesh manufactured by this process is ≤30 um. In a case that the depth-to-width ratio of the metal mesh is ≥1:1, the trace width of the metal mesh manufactured by this process is <5 um. The sheet resistance of the metal mesh manufactured by this process is lower than that of the metal mesh manufactured by the imprinting process. As shown in FIG. 8e, manufacturing steps of the imprint electroplating process are as follows:

① An imprint resist is coated on a surface of a base substrate. In this step, the base substrate can be selected from a rigid substrate (glass, etc.) or a flexible substrate (PET, PI, COP, PEN, etc.) The imprint resist is usually a polymer that can be cured by heat or ultraviolet light. In this step, a thickness of an imprint resist film is greater than a height of traces of the metal mesh.

② Imprinting and demoulding. In this step, an imprint mold is used for manufacturing a groove of imprint resist, and then the mold is demoulded after curing. The imprint mold can be selected from metal mold, polymer mold, etc., and a curing method of the imprint resist can be selected from thermal curing, ultraviolet curing or a combination of heat curing and ultraviolet curing.

③ A conductive paste is filled. In this step, the conductive paste can be selected from conductive silver paste and conductive copper paste. The conductive paste is made to flow into the groove by a blade coating process, and only in the groove, part of the paste is filled, and after residual paste on the surface is scraped, solvent and other substances in the paste are volatilized by thermal curing or light curing, so that metal particles are fusioned and converted into a partially continuous phase.

④ Electroplating. In this step, the cured conductive paste is used as a seed layer, and a metal material such as electroplated copper or nickel fills the groove.

The screen printing process is suitable for manufacturing a metal mesh with a line width ≥20 μm. As shown in FIG. 8f, manufacturing steps of the screen printing process are as follows:

① Screen printing conductive paste is used on a surface of a base substrate. In this step, the base substrate can be selected from a rigid substrate (glass, etc.) or a flexible substrate (PET, PI, COP, PEN, etc.) The conductive paste is usually conductive silver paste.

② Drying. In this step, a drying method can be selected from thermal curing, light curing and other methods.

In an embodiment of the present disclosure, the sensing substrate can also be manufactured by a laser cutting (or lase carving) process. The laser cutting process is suitable for manufacturing a metal mesh with a line width ≥15 μm and a depth-to-width ratio <1:1. As shown in FIG. 8g, manufacturing steps of the laser cutting process are as follows:

① A metal film layer is manufactured on a surface of a base substrate.

② A metal mesh pattern is directly formed by using laser processing.

Figure 9:
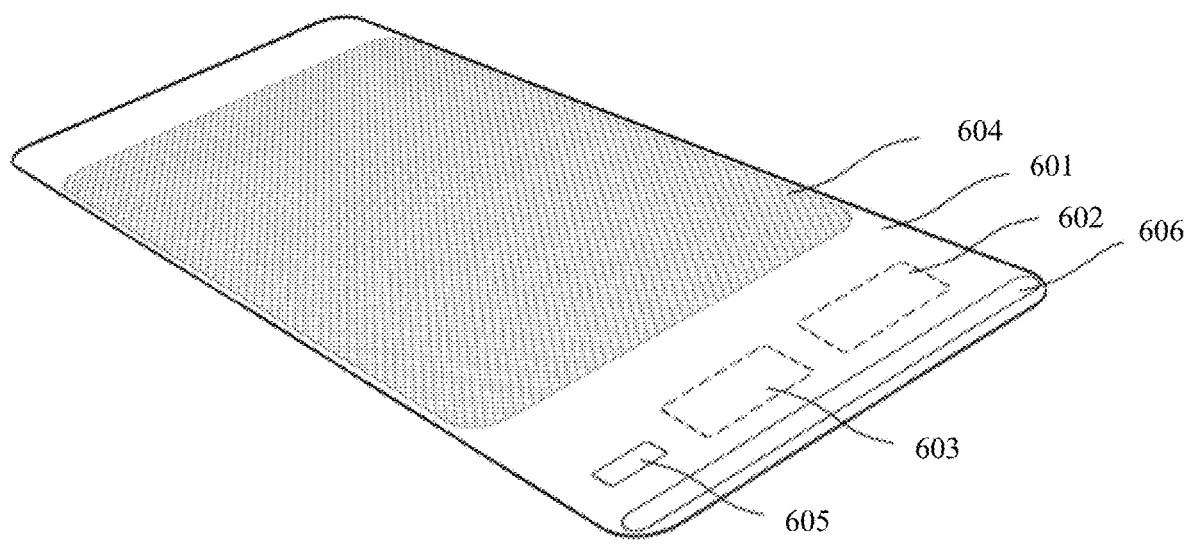
FIG. 9 is a schematic diagram of a structure of an electronic apparatus according to an embodiment of the present disclosure.

As shown in FIG. 9, an embodiment of the present disclosure further provides an electronic apparatus, including any of the aforementioned sensing substrates 604, and further including an apparatus body 601, a control circuit board 602 and an energy storage part 603 disposed in the apparatus body 601.

The sensing substrate 604 is disposed in the apparatus body 601 and electrically connected to the control circuit board 602 and the energy storage part 603 respectively.

The control circuit board 602 is configured to control a heat electrode and a strain detection electrode, and the energy storage part 603 is configured to supply power to the heat electrode and the strain detection electrode.

In an exemplary embodiment, the electronic apparatus further includes a control button 605 and a fixation part 606, which are disposed on the apparatus body 601.

The control button 605 is electrically connected to the control circuit board 602.

The fixation part 606 is configured to fix the electronic apparatus.

The electronic apparatus in the embodiment of the present disclosure can be applied to wearing on any part of a human body according to conditions of human body. In an exemplary embodiment, the apparatus body 601 can be made of fabric, and can be in a hollow double-layer structure as a whole. The sensing substrate 604 is placed in the apparatus body 601, and the control circuit board 602 controls operation and signal transmission of the electronic apparatus. Two electrodes which are respectively led from the heat electrode and the strain detection electrode are electrically connected to the control circuit board 602. The apparatus body 601 may be provided with the fixation part 606 for fixing the electronic apparatus when in use. For example, the fixation part 606 may be a fixing structure with a pasting function. The heat electrode and the strain detection electrode are of a metal mesh structure, and an area of the metal mesh can be customized according to actual situations. The apparatus body 601 can be hollowed out to expose part or all of the heat electrode and the strain detection electrode, or can completely wrap the heat electrode and the strain detection electrode.

In an exemplary embodiment, the electronic apparatus further includes a charging interface disposed on the apparatus body 601, wherein the charging interface is electrically connected to the energy storage part 603 and configured to charge the energy storage part 603.

Figure 10:
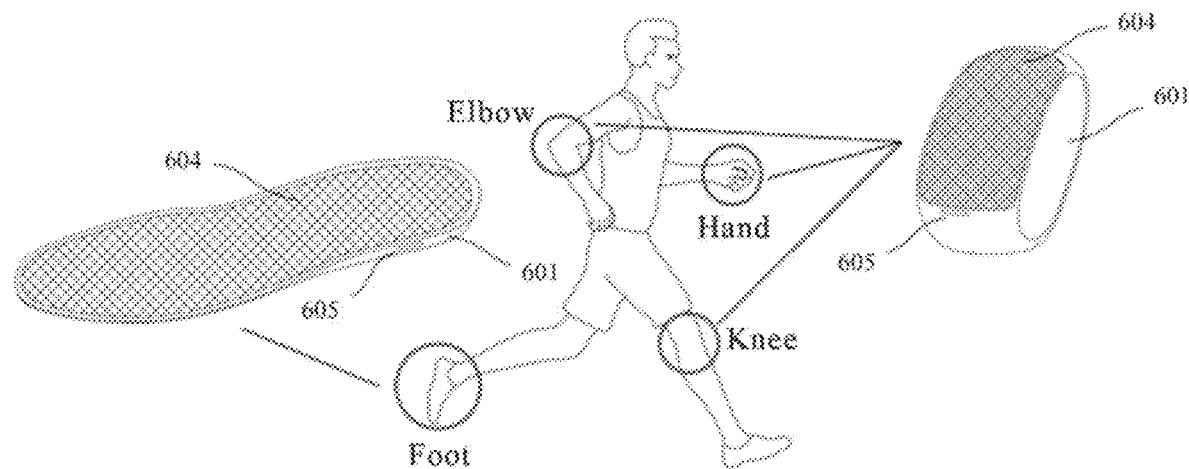
FIG. 10 is a schematic diagram of an application scenario of an electronic apparatus according to an embodiment of the present disclosure.

In a case that the electronic apparatus in the embodiment of the present disclosure is applied to a wearable device, it can be applied to any part of a human body, including hands, elbows, knees, feet, etc. As shown in FIG. 10, structures of electronic apparatuses applied to hands, elbows and knees are similar, the device apparatus body 601 can be provided in a ring shape, and a first surface of the apparatus body 601 is provided with a heat electrode, a strain detection electrode and an interactive structure, wherein the interactive structure includes a control button, a charging interface, etc. The heat electrode and the strain detection electrode can be provided in any shape. A second surface of the apparatus body 601 is provided with a fixation part, wherein the first surface and the second surface are oppositely disposed. Inside the apparatus body 601, components such as an energy storage part (energy storage battery) and a control circuit board are integrated. When applied to feet, the electronic apparatus can be made into a shape of an insole. The apparatus body 601 can be made of rubber, fabric and other materials. The first surface of the apparatus body 601 is provided with the heat electrode and the strain detection electrode, which can be in any shape. A side surface of the apparatus body 601 can be provided with an interactive structure such as a control button and a charging interface. The apparatus body 601 is internally integrated with the energy storage part (energy storage battery), the control circuit board and other components.

In actual applications, positions and shapes of the heat electrode and the strain detection electrode can be designed according to requirements.

Figure 11A:
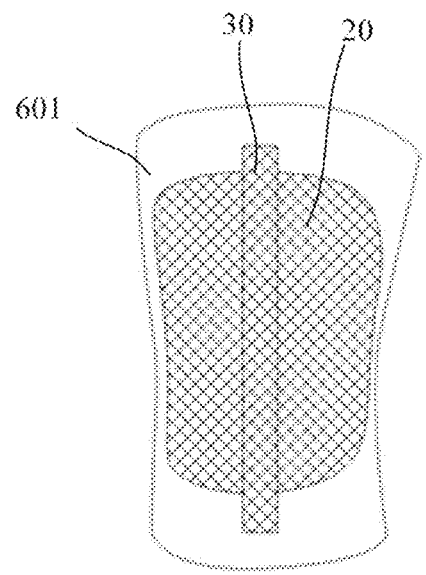
FIGS. 11a to 11b are schematic diagrams of two types of electrode shapes when an electronic apparatus according to an embodiment of the present disclosure is applied to knees.

In a case that the heat electrode and the strain detection electrode are separated structures, the heat electrode can be disposed close to a human body, so that the heat transfer efficiency is higher. The shapes of the heat electrode and the strain detection electrode can be designed separately. When designing the heat electrode, it is necessary to ensure that a position usually with a low temperature, which is in contact with the human body, is covered by the electrode. When designing the strain detection electrode, it is necessary to ensure that a position with large deformation is covered by the electrode, and the electrode should be consistent with the deformation direction, so that an overall structure of the electrode can have enough strain with the motion of the human body, thus quality of a strain detection signal can be ensured. Taking a wearable device applied to knees as an example. The shapes of the heat electrode and the strain detection electrode may be referred to FIG. 11a. As shown in FIG. 11a, the heat electrode and the strain detection electrode are stacked, with the heat electrode being disposed underneath and the strain detection electrode being disposed above the heat electrode. The heat electrode covers the whole knee joint, which can ensure that the knee has enough heating area. Since the knee mainly moves in a longitudinal direction, the strain detection electrode can be disposed in the longitudinal direction to ensure enough deformation during the motion.

Figure 11B:
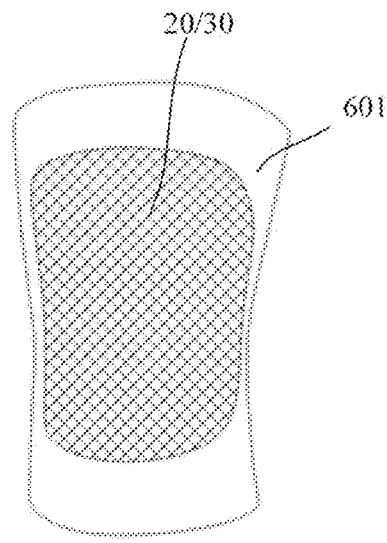

In a case that the heat electrode and the strain detection electrode are in an integrated structure, the shape of the common electrode can be designed according the requirements of the heat electrode in order to ensure generating enough heat. Taking a wearable device applied to knees as an example. A shape of a common electrode may be referred to FIG. 11b. As shown in FIG. 11b, the common electrode covers the whole knee joint, which can ensure that the knee has enough heating area. Such shape of the strain detection electrode can also ensure enough deformation during motion of the knee.

Figure 12:
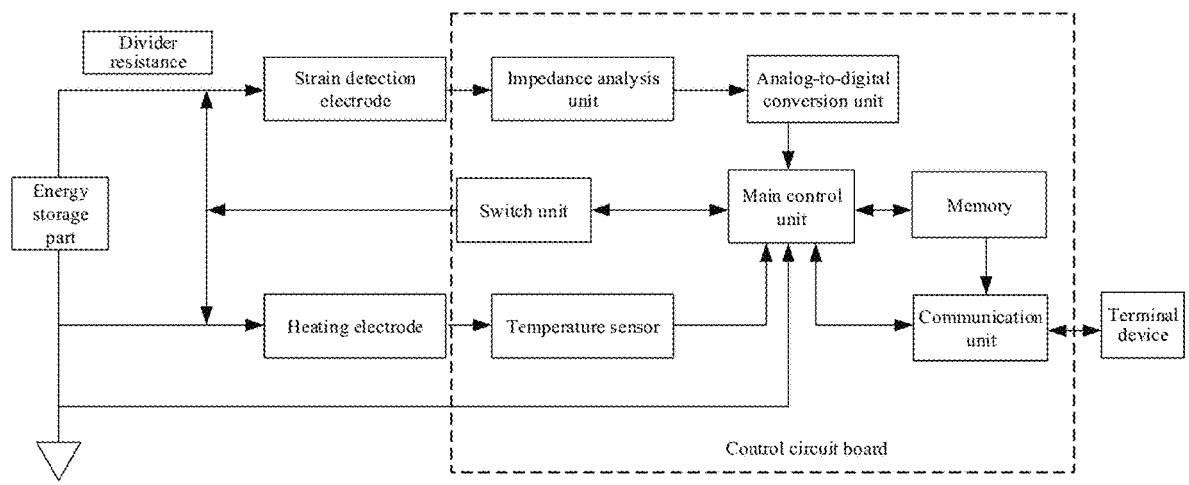
FIG. 12 is a schematic diagram of an operating principle of an electronic apparatus according to an embodiment of the present disclosure.

In an exemplary embodiment, as shown in FIG. 12, the control circuit board 602 includes a main control unit, an impedance analysis unit, an analog-to-digital conversion unit, a switch unit and a temperature sensor.

The impedance analysis unit is electrically connected to the strain detection electrode and the analog-to-digital conversion unit respectively, and is configured to detect electrical parameters of the strain detection electrode and output the detected electrical parameters to the analog-to-digital conversion unit.

The analog-to-digital conversion unit is electrically connected to the impedance analysis unit and the main control unit respectively, and is configured to receive the electrical parameters output by the impedance analysis unit, perform analog-to-digital conversion on the received electrical parameters, and output them to the main control unit.

The temperature sensor is electrically connected to the heat electrode and the main control unit respectively, and is configured to detect a temperature of the heat electrode and output the temperature to the main control unit.

The main control unit is electrically connected to the switch unit, the analog-to-digital conversion unit and the temperature sensor respectively, and is configured to perform strain detection according to the electrical parameters after the analog-to-digital conversion and control the heat electrode according to the received temperature of the heat electrode.

In a case that the heat electrode and the strain detection electrode are separated structures, the energy storage part supplies power to the strain detection electrode and the heat electrode respectively, and the whole system is controlled by the main control unit.

During strain detection, the impedance analysis unit processes an analog signal of the strain detection electrode, the analog-to-digital conversion unit transmits a digital signal to the main control unit, and data can be stored in a memory or directly transmitted to an external terminal device by a communication unit. Communication protocols used by the communication unit include, but are not limited to, Bluetooth, Wireless Fidelity (WiFi), Zig-Bee, Ultra Wide Band (UWB), Near Field Communication (NFC), etc. The terminal device can also send instructions to the main control unit through the communication unit to control operations of the system.

During heating, a set temperature is input to the terminal device, and the main control unit controls the heat electrode to be turned on. The temperature sensor collects the temperature of the heat electrode and transmits the temperature to the main control unit. When the temperature of the heat electrode rises to the preset temperature, the main control unit controls the switch unit to turn off, or reduces the current of the heat electrode to achieve a heat preservation function.

Figure 13:
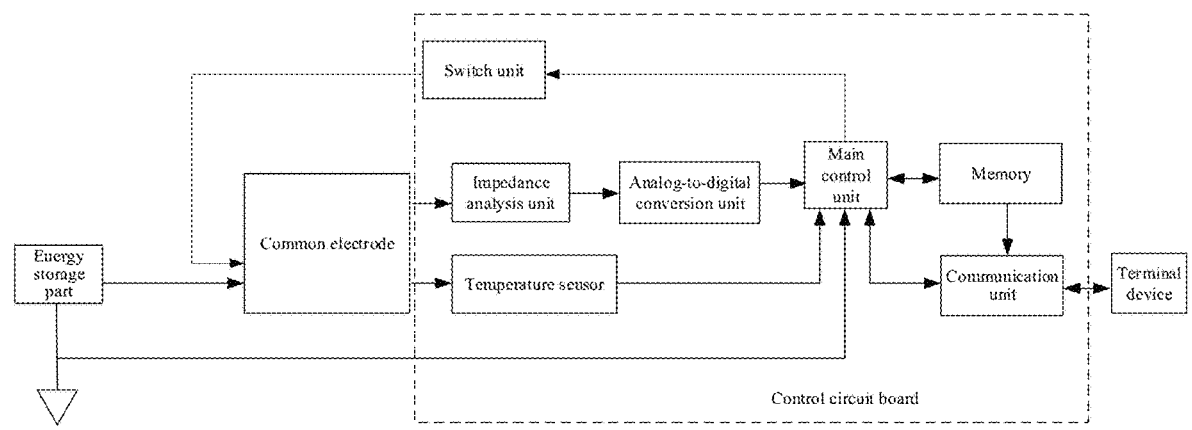
FIG. 13 is a schematic diagram of another operating principle of an electronic apparatus according to an embodiment of the present disclosure.

In another exemplary embodiment, as shown in FIG. 13, a control circuit board 602 includes a main control unit, an impedance analysis unit, an analog-to-digital conversion unit, a switch unit and a temperature sensor.

The impedance analysis unit is electrically connected to a common electrode and the analog-to-digital conversion unit respectively, and is configured to detect electrical parameters of the common electrode and output the detected electrical parameters to the analog-to-digital conversion unit.

The analog-to-digital conversion unit is electrically connected to the impedance analysis unit and the main control unit respectively, and is configured to receive the electrical parameters output by the impedance analysis unit, perform analog-to-digital conversion on the received electrical parameters, and output them to the main control unit.

The temperature sensor is electrically connected to the common electrode and the main control unit respectively, and is configured to detect a temperature of the common electrode and output the temperature to the main control unit.

The main control unit is electrically connected to the switch unit, the analog-to-digital conversion unit and the temperature sensor respectively, and is configured to perform strain detection according to the electrical parameters after the analog-to-digital conversion and control the common electrode according to the received temperature of the common electrode.

In an exemplary embodiment, the electronic apparatus has a heating mode, a strain detection mode and a sharing mode.

In the strain detection mode, an energy storage part loads a first voltage for the common electrode.

In the heating mode, the energy storage part loads a second voltage for the common electrode, wherein the first voltage is less than the second voltage.

In the sharing mode, in a strain detection stage, the energy storage part loads the first voltage for the common electrode, and in a heating stage, the energy storage part loads the second voltage for the common electrode. The heating stage includes multiple heating time slots, and the strain detection stage is set in a gap between the multiple heating time slots.

According to the electronic apparatus in the embodiment of the present disclosure, a layer of common electrode is used for implementing heating and strain detection at the same time, and the single common electrode has the functions of strain sensing and heating by time sequence controlling, and such driving mode simplifies the device structure and reduces costs.

In a case that the heat electrode and the strain detection electrode are in an integrated structure, the electronic apparatus has three operation modes:

(1) A strain detection mode: during strain detection, the main control unit inputs an operation signal to make the common electrode operate at a low voltage, and the impedance analysis unit processes an analog signal of the common electrode. The analog-to-digital conversion unit transmits a digital signal to the main control unit, and data can be stored in a memory or directly transmitted to an external terminal device by a communication unit. Communication protocols used by the communication unit include, but are not limited to, Bluetooth, WiFi, Zig-Bee, UWB, NFC, etc. The terminal device can also send instructions to the main control unit through the communication unit to control operations of the system.

(2) Heating mode: during heating, a set temperature is input to the terminal device, and the main control unit inputs an operation signal, makes the heat electrode operate at a high voltage. The temperature sensor collects a temperature of the common electrode and transmits the temperature to the main control unit. When the temperature of the common electrode rises to the preset temperature, the main control unit controls the switch unit to turn off, or reduces a current of the common electrode to achieve a heat preservation function.

Figure 14:
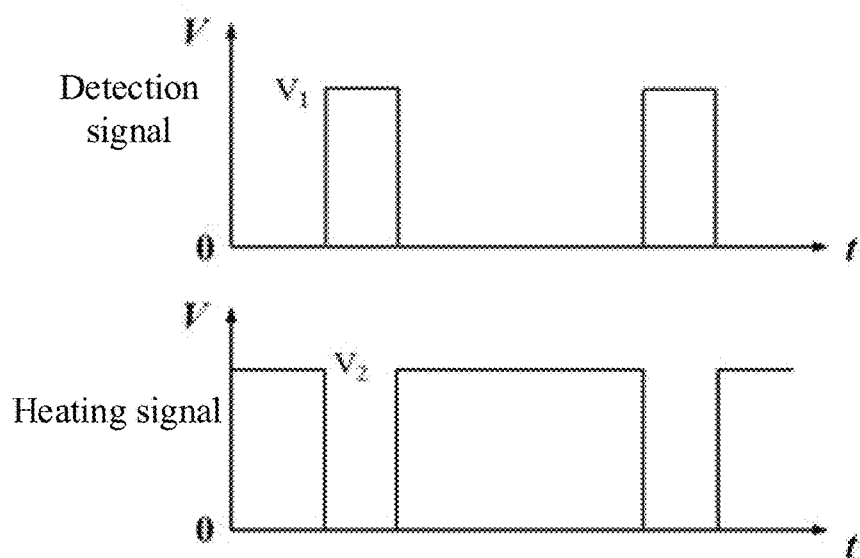
FIG. 14 is a schematic diagram of voltage signals loaded on two sides of a common electrode in FIG. 13 in a sharing mode.

(3) Sharing mode: when detecting strain and heating at the same time, a strain detection instruction and a set temperature are input to the terminal device, and a time sequence controller in the main control unit converts prestored data signal, control signal and clock signal into the operation signal, so that the common electrode can enter different operation modes at different time periods. As shown in FIG. 14, operating voltages of strain detection and heating modes are V1 and V2 respectively, wherein V1 is much less than V2. The common electrode keeps intermittent operation at the voltage of V2 for a long time to provide a relatively stable heating function. During an interval in the heating, the lower voltage V1 is input to the common electrode, and a current signal on the common electrode is intermittently collected to detect the strain. This driving mode is conducive to simplifying the structure of the electronic apparatus and reducing costs.

An embodiment of the present disclosure further provides a method for manufacturing a sensing substrate, which includes:

manufacturing a heat electrode and a strain detection electrode on a base substrate, wherein each of the heat electrode and the strain detection electrode is in a metal mesh structure, the heat electrode is configured to perform heating, and the strain detection electrode is configured to detect strain; and forming an insulation layer covering the heat electrode and the strain detection electrode.

According to the sensing substrate, the manufacturing method thereof and the electronic apparatus in the embodiments of the present disclosure, the heat electrode and the strain detection electrode in the metal mesh structure are integrated on the base substrate, and the heating function and the strain detection function are integrated, so that the sensing substrate can be applied to wearable devices, can be attached to any curved surface, can be heated at any time, continuously detects the strain to monitor a motion state of an object, and has wide application scenarios in the fields of daily warmth keeping, sports protection and medical health. Moreover, the manufacturing processes are compatible with the current backplane manufacturing process, which meet the requirements of mass production. Furthermore, the embodiment of the present disclosure can be realized by current mature manufacturing equipment, can be well compatible with the current manufacturing processes, has advantages such as low manufacturing costs, easy process realization, high production efficiency, high product yield, etc., and has a good application prospect.

In the description of embodiments of the present disclosure, orientation or positional relationships indicated by terms "middle", "upper", "lower", "front", "back", "vertical", "horizontal", "top", "bottom", "inside", "outside" and the like are based on the orientation or positional relationships shown in the drawings, and are for the purpose of ease of description of the present disclosure and simplification of the description only, but are not intended to indicate or imply that the referred device or element must have a specific orientation, or be constructed and operated in a particular orientation, and therefore they should not be construed as limitations on the present disclosure.

In the description of embodiments of the present disclosure, unless otherwise explicitly specified and defined, terms "install", "connect", "couple" should be understood in a broad sense, for example, a connection may be a fixed connection or a detachable connection, or an integrated connection; it may be a mechanical connection or an electrical connection; it may be a direct connection, or may be an indirect connection through an intermediary, or may be an internal connection between two elements. Those of ordinary skills in the art may understand specific meanings of these terms in the present disclosure according to specific situations.

Although the embodiments disclosed in the present disclosure are as above, the described contents are only embodiments used for convenience of understanding the present disclosure and are not intended to limit the present disclosure. Any skilled person in the art to which the present disclosure pertains can make any modifications and variations in implementation manners and details without departing from the spirit and scope of the present disclosure. However, the protection scope of the present disclosure should be subject to the scope defined by the appended claims.

The invention claimed is:

1. A sensing substrate, comprising at least one a base substrate, a heat electrode and a strain detection electrode which are disposed on the at least one base substrate, and an insulation layer covering the heat electrode and the strain detection electrode;
   wherein the heat electrode is configured to perform heating, and the strain detection electrode is configured to monitor, by deformation, a motion state of a human body; and
   a structure of each of the heat electrode and the strain detection electrode is a metal mesh.

2. The sensing substrate according to claim 1, wherein the sensing substrate comprises a first base substrate and a second base substrate, wherein the heat electrode is disposed on the first base substrate and the strain detection electrode is disposed on the second base substrate;
   the sensing substrate further comprises an adhesive layer, wherein the first base substrate, the heat electrode, the adhesive layer, the second base substrate, the strain detection electrode and the insulation layer are sequentially stacked from bottom to top, or the second base substrate, the strain detection electrode, the adhesive layer, the first base substrate, the heat electrode and the insulation layer are sequentially stacked from bottom to top.

3. The sensing substrate according to claim 2, wherein the structure of the heat electrode is a first metal mesh, and the structure of the strain detection electrode is a second metal mesh, the first metal mesh comprises a plurality of first repetitive grids, and the second metal mesh comprises a plurality of second repetitive grids, and shapes and sizes of the first repetitive grids and the second repetitive grids are the same.

4. The sensing substrate according to claim 2, wherein an orthogonal projection of the heat electrode on the first base substrate coincides with an orthogonal projection of the strain detection electrode on the first base substrate.

5. The sensing substrate according to claim 2, wherein an orthogonal projection of the heat electrode on the first base substrate and an orthogonal projection of the strain detection electrode on the first base substrate are arranged in a staggered manner.

6. The sensing substrate according to claim 2, wherein the structure of the heat electrode is a first metal mesh, and the structure of the strain detection electrode is a second metal mesh, the first metal mesh comprises a plurality of first repetitive grids, and the second metal mesh comprises a plurality of second repetitive grids, a line width of each first repetitive grid is less than 30 μm, and a line width of each second repetitive grid is less than 10 μm.

7. The sensing substrate according to claim 6, wherein a ratio of a line spacing to the line width of each of the first repetitive grid and the second repetitive grid is between 0.005 and 0.02; or
   an included angle between traces of each of the first repetitive grid and the second repetitive grid is between 60° and 120°.

8. The sensing substrate according to claim 1, wherein the sensing substrate comprises one base substrate, and the heat electrode and the strain detection electrode are disposed on two opposite surfaces of the base substrate respectively;
   the sensing substrate further comprises a first insulation layer and a second insulation layer, wherein the first insulation layer, the heat electrode, the base substrate, the strain detection electrode and the second insulation layer are sequentially stacked from bottom to top, or the first insulation layer, the strain detection electrode, the base substrate, the heat electrode and the second insulation layer are sequentially stacked from bottom to top.

9. The sensing substrate according to claim 1, wherein the sensing substrate comprises a first base substrate and a second base substrate, wherein the heat electrode is disposed on the first base substrate and the strain detection electrode is disposed on the second base substrate;
   the first base substrate, the heat electrode, the insulation layer, the strain detection electrode and the second base substrate are sequentially stacked from bottom to top, or the second base substrate, the strain detection electrode, the insulation layer, the heat electrode and the first base substrate are sequentially stacked from bottom to top.

10. The sensing substrate according to claim 1, wherein a thickness of the heat electrode in a direction perpendicular to the at least one base substrate is less than 5 μm, and a thickness of the strain detection electrode in the direction perpendicular to the at least one base substrate is less than 5 μm.

11. The sensing substrate according to claim 1, wherein the heat electrode and the strain detection electrode are integrated as a common electrode.

12. The sensing substrate according to claim 1, wherein the at least one base substrate is a flexible substrate.

13. An electronic apparatus comprising a sensing substrate, an apparatus body, a control circuit board and an energy storage part which are disposed in the apparatus body;
   wherein the sensing substrate comprises at least one base substrate, a heat electrode and a strain detection electrode which are disposed on the at least one base substrate, and an insulation layer covering the heat electrode and the strain detection electrode;

wherein the heat electrode is configured to perform heating, and the strain detection electrode is configured to monitor, by deformation, a motion state of a human body; and a structure of each of the heat electrode and the strain detection electrode is a metal mesh;

wherein the sensing substrate is disposed in the apparatus body and electrically connected to the control circuit board and the energy storage part respectively; and the control circuit board is configured to control the heat electrode and the strain detection electrode, and the energy storage part is configured to supply power to the heat electrode and the strain detection electrode.

14. The electronic apparatus according to claim 13, wherein the control circuit board comprises a main control unit, an impedance analysis unit, an analog-to-digital conversion unit, a switch unit and a temperature sensor;

the impedance analysis unit is electrically connected to the strain detection electrode and the analog-to-digital conversion unit respectively, and is configured to detect an electrical parameter of the strain detection electrode and output the detected electrical parameter to the analog-to-digital conversion unit;

the analog-to-digital conversion unit is electrically connected to the impedance analysis unit and the main control unit respectively, and is configured to receive the electrical parameter output by the impedance analysis unit, perform analog-to-digital conversion on the received electrical parameter, and output it to the main control unit;

the temperature sensor is electrically connected to the heat electrode and the main control unit respectively, and is configured to detect a temperature of the heat electrode and output the temperature to the main control unit; and the main control unit is electrically connected to the switch unit, the analog-to-digital conversion unit and the temperature sensor respectively, and is configured to perform strain detection according to the received electrical parameter and control the heat electrode according to a received temperature parameter.

15. The electronic apparatus according to claim 13, wherein the heat electrode and the strain detection electrode are integrated as a common electrode, and the control circuit board comprises a main control unit, an impedance analysis unit, an analog-to-digital conversion unit, a switch unit and a temperature sensor;

the impedance analysis unit is electrically connected to the common electrode and the analog-to-digital conversion unit respectively, and is configured to detect an electrical parameter of the common electrode and output the detected electrical parameter to the analog-to-digital conversion unit;

the analog-to-digital conversion unit is electrically connected to the impedance analysis unit and the main control unit respectively, and is configured to receive the electrical parameter output by the impedance analysis unit, perform analog-to-digital conversion on the received electrical parameter, and output it to the main control unit;

the temperature sensor is electrically connected to the common electrode and the main control unit respectively, and is configured to detect a temperature of the common electrode and output the temperature to the main control unit; and the main control unit is electrically connected to the switch unit, the analog-to-digital conversion unit and the temperature sensor respectively, and is configured to perform strain detection according to the received electrical parameter and control the common electrode according to a received temperature parameter.

16. The electronic apparatus according to claim 15, wherein the electronic apparatus comprises a heating mode, a strain detection mode and a sharing mode;

in the strain detection mode, the energy storage part loads a first voltage for the common electrode;

in the heating mode, the energy storage part loads a second voltage for the common electrode, wherein the first voltage is less than the second voltage; and in the sharing mode, in a strain detection stage, the energy storage part loads the first voltage for the common electrode, and in a heating stage, the energy storage part loads the second voltage for the common electrode, and the heating stage comprises a plurality of heating time slots, and the strain detection stage is set in a gap between the heating time slots.

17. The electronic apparatus according to claim 13, further comprising a control button and a fixation part disposed on the apparatus body;

the control button is electrically connected to the control circuit board; and the fixation part is configured to fix the electronic apparatus.

18. A method for manufacturing a sensing substrate, comprising:

manufacturing a heat electrode and a strain detection electrode on at least one base substrate, wherein a structure of each of the heat electrode and the strain detection electrode is a metal mesh, the heat electrode is configured to perform heating, and the strain detection electrode is configured to monitor, by deformation, a motion state of a human body; and forming an insulation layer covering the heat electrode and the strain detection electrode.

19. The method according to claim 18, further comprising:

manufacturing the metal mesh by a thin film manufacturing process to make a thickness of the metal mesh in a direction perpendicular to the at least one base substrate be less than or equal to 2 μm; or manufacturing the metal mesh by a thick film manufacturing process or a photosensitive silver salt process to make the thickness of the metal mesh in the direction perpendicular to the at least one base substrate be greater than 2 μm.

20. The method according to claim 18, further comprising:

manufacturing the metal mesh by an imprinting process or an imprint electroplating process to make a depth-to-width ratio of the metal mesh be less than 1:1 and a trace width of the metal mesh be less than or equal to 30 μm, or the depth-to-width ratio of the metal mesh be greater than or equal to 1:1 and the trace width of the metal mesh be less than 5 μm; or manufacturing the metal mesh by a screen printing process to make a line width of the metal mesh be greater than or equal to 20 μm; or manufacturing the metal mesh by a laser cutting process to make the line width of the metal mesh be greater than or equal to 15 μm and the depth-to-width ratio of the metal mesh be less than 1:1.

\* \* \* \* \*